(12) United States Patent
Goetter et al.

(10) Patent No.: US 7,964,236 B2
(45) Date of Patent: Jun. 21, 2011

(54) USE OF NANOMATERIALS IN SECONDARY ELECTRICAL INSULATION COATINGS

(75) Inventors: Ronald W. Goetter, Maryville, IL (US); David L. Vines, Imperial, MO (US)

(73) Assignee: Elantas PDG, Inc., St. Louis, MO (US)

( * ) Notice: Subject to any disclaimer, the term of this patent is extended or adjusted under 35 U.S.C. 154(b) by 930 days.

(21) Appl. No.: 11/252,921

(22) Filed: Oct. 18, 2005

(65) Prior Publication Data

US 2007/0087116 A1    Apr. 19, 2007

(51) Int. Cl.
*B05D 5/12*    (2006.01)
*B05D 1/12*    (2006.01)

(52) U.S. Cl. .................. 427/96.2; 427/96.3; 427/180

(58) Field of Classification Search .............. 427/96.3, 427/180
See application file for complete search history.

(56) References Cited

U.S. PATENT DOCUMENTS

| | | | |
|---|---|---|---|
| 6,265,466 B1 * | 7/2001 | Glatkowski et al. | 523/137 |
| 6,350,493 B1 * | 2/2002 | Podlaseck et al. | 427/96.3 |
| 7,297,370 B2 * | 11/2007 | Vallance et al. | 427/372.2 |
| 2003/0146418 A1 * | 8/2003 | Chacko | 252/511 |
| 2004/0063813 A1 * | 4/2004 | Wu et al. | 523/200 |
| 2006/0083851 A1 * | 4/2006 | Yan et al. | 427/96.2 |
| 2006/0167139 A1 * | 7/2006 | Nelson et al. | 523/212 |

* cited by examiner

*Primary Examiner* — Brian K Talbot

(74) *Attorney, Agent, or Firm* — Polster, Lieder, Woodruff & Lucchesi, L.C.

(57) ABSTRACT

Use of the barrier property effect of nanomaterials to improve the electrical insulation resistance, corrosion protection and bond strength properties of electromagnetic devices. The beneficial effects are realized with nanomaterial loadings of 1-20%, and preferably between 1-5%, parts by weight of coating resins. Nanomaterials include, but are not limited to, silica, alumina, zirconia, and antimony pentoxide, which are dispersed either directly into a coating, or pre-dispersed in a carrier appropriate to the solvent of the resin system. Resulting formulations benefit from the fact anti-settling agents need not be incorporated into the resin to keep the inorganic material suspended. Also, the rheology of the resin system is not significantly altered which would otherwise affect processing of the resins for their intended applications.

13 Claims, No Drawings

USE OF NANOMATERIALS IN SECONDARY ELECTRICAL INSULATION COATINGS

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to electromagnetic devices; and, more particularly, to the use of nanomaterials in insulation coatings for these devices.

Organic resin compositions are used as coatings for the mechanical, electrical and environmental-resistance they impart to electromagnetic devices. The coatings provide a mechanical strength, electrical insulation, and environmental protection for improved long-term durability of the devices, as well as increasing the quality of the final product. Some of these beneficial properties can be improved by the addition of inorganic fillers such as silica, calcium carbonate, alumina, etc. However, a problem with the current state of this technology is that the inorganic materials used in the coatings do not always remain suspended in the mixtures for the coatings during storage of the coating mixtures, resulting in a non-homogeneous coating mixture. When the coating mixtures are applied to the devices to form a coating on the device, areas of weakness result in the coating that, in turn, can cause failure of a device.

This current state of the art raises several issues related to the handling of the coating, its agitation (to produce homogeneity before application) and its pumping, and concerns about the homogeneity of both the applied liquid and the resulting cured film. Prior approaches employed to address these problems have focused on the use of fumed silica and other materials used as suspension agents for the inorganic materials. But, in some instances, use of these agents produce undesirable results because of rheological changes which occur and cause inconsistencies in the applied coatings.

BRIEF SUMMARY OF THE INVENTION

The present invention is directed to coatings utilizing the barrier property effect of nanomaterials to improve the electrical insulation resistances and corrosion protection of electromagnetic devices; without the coating having the non-homogeneity problems described above. These beneficial effects are realized with nanomaterial loadings of 1-20%, and preferably between 1-5%, parts by weight to the coating resin. The materials used include, but are not limited to, silica, alumina, zirconia, and antimony pentoxide. These are dispersed either directly into a coating, or pre-dispersed in a carrier appropriate to the solvent of the resin system being modified. The resulting formulations benefit from the fact anti-settling agents need not be incorporated in the coating mixture to keep the inorganic material suspended in the coating mixture during storage of the coating mixture. A further benefit is that the rheology of the resin system is not significantly altered which would otherwise affect the processing of the resins in their intended applications.

Other objects and features will be in part apparent and in part pointed out hereinafter.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

In accordance with the present invention, barrier property effects of nanomaterials are used to improve the electrical insulation resistance and corrosion protection properties of electromagnetic devices coated with a coating resin incorporating the nanomaterials, while simultaneously avoiding the homogeneity problems previously discussed. To achieve these desired results, inorganic materials in the 1-150 nanometer range are used in formulating the coating resins applied to the devices. By contrast, the size of inorganic particles in current, state-of-the-art filler systems is on the order of 1500 nanometers. Suitable chemistries include, but are not limited to, unsaturated polyesters, epoxies, urethanes, waterborne polyesters, epoxy emulsions, organic solvent borne alkyds, acrylated urethanes, acrylated epoxies, acrylated polyols, and acrylated vegetable oils. The desired effects are achieved using nanomaterial loadings of between 1-20% parts by weight, and preferably between 1-5% parts by weight, of a nanomaterial to the resin. Nanomaterials include, but are not limited to, silica, alumina, zirconia, and antimony pentoxide. Those skilled in the art will understand that the resulting coatings can be tailored to meet specific performance requirements for a device by the inclusion of an appropriate amount of a nanomaterial or a combination of nanomaterials. One important advantage of the coatings of the present invention is that the rheology of the resin system is not significantly altered; although, in some instances, there is an increase in the viscosity of the resulting mixture. Overall, though, processing of the resins for their intended applications is not materially affected.

With respect to the use of nanomaterials, their small particle size means that a given amount of material is more evenly distributed throughout the resin, creating a more tortuous path which is harder for corrosive agents to penetrate. Further, the particles being in close proximity to each other, promotes dissipation of any electrical charge, thereby leading to improved electrical properties of a device.

The barrier effect resulting from use of the nanomaterials produces significant results in the coatings made in accordance with the invention. For example, the improved electrical and corrosion resistance properties referred to above occur even though lower amounts of inorganic nanomaterials are used in producing a coating using other inorganic filler materials. The coatings also have an improved abrasion resistance, even though, again, lower amounts of inorganic nanomaterials are used in the coating. Third, some of the new coatings may have a lower viscosity than current coatings. All of these features serve to provide greater flexibility in processing options for the coating, while achieving desired performance characteristics for the completed device.

During preparation, the nanomaterials are dispersed directly into a coating. Or, alternatively, the nanomaterial is pre-dispersed in a carrier appropriate to the solvent of the resin system being modified. A significant advantage of the resulting formulations is that anti-settling or suspension agents such as fumed silica, etc., do not need to be added to the resulting solution to keep the nanomaterial suspended in the coating mixture during storage of the coating mixture. A second advantage is that homogeneity of the coating mixture is achieved and maintained with a minimal amount of agitation of the mixture as compared to that required for conventional coatings having inorganic fillers.

Nanomaterial modified organic coatings are applied using the same processes currently used in the industry. These include, but are not limited to, dip and bake, trickle, vacuum/pressure impregnation, roll through, spray, and vacuum impregnation. In addition, coatings made in accordance with the present invention are cured using currently available methods such as gas-fired ovens, resistance heating, infrared radiation heating, chemical catalyzation and ultraviolet (UV) radiation curing. Regardless of the method of application, coatings incorporating a nanomaterial more readily flow into the areas of the electromagnetic device being coated, since the inorganic nanomaterial is of a smaller particle size than the organic filler materials used in conventional coatings. Further, with respect to UV curing processes, coatings made in accordance with the present invention have been found to exhibit an improved optical clarity. This facilitates use of UV induced curing processes that cannot now be used because of the presence of organic fillers in current coatings.

The following discussion refers to Tables 1 and 2.

TABLE 1

|  | Standard Filled UPE | System I | System II |
|---|---|---|---|
| Commercial Polyester A | 70 | 99 | 97 |
| Silica, 2.9 microns | 30 | 0 | 0 |
| Nanoalumina, 50 nanometers | 0 | 1 | 3 |

TABLE 2

|  | Standard WBPE | System III |
|---|---|---|
| Commercial Waterborne Polyester | 100 | 97 |
| Nanoalumina, 150 nanometers | 0 | 3 |

Preparation:

Referring to Table 1, a standard filled unsaturated polyester (UPE) coating was prepared by dispersing 30 parts by weight (pbw) of silica in 70 pbw of a UPE resin using a high speed dispersion process, until the resulting mixture was homogeneous. In addition, two nano-modified UPE samples were prepared. The first, referred to as System I in Table 1, was prepared by adding 1 pbw of a nanomaterial to 99 pbw of the UPE resin and then mixing until dispersed. The second, referred to as System II in Table 1, was prepared by adding 3 pbw of the nanomaterial to 97 pbw of the UPE resin and again mixing until well dispersed.

Referring to Table 2, a nano-modified waterborne polyester (WBPE) coating, referred to as System III in the Table, was prepared by adding 3 pbw of a nanomaterial to 97 pbw of WBPE and mixing until well dispersed. The WBPE component of the system comprised alumina predispersed in water (Nanophase).

Physical properties of the representative formulations are listed in Table 3.

TABLE 3

|  | Standard UPE | Standard Filled UPE | UPE w/ Nanomaterial |
|---|---|---|---|
| Inorganic Loading, % | 0 | 30 | 3 |
| Viscosity, 25° C., Cp | 100-200 | 150-250 | 150-400 |
| Density, 25° C. | 1.09 | 1.30 | 1.09 |

Test results of formulation examples are listed in Tables 4 and 5 in which corrosion and settling ratings of 1-10 for corrosion are based on 1 being worst, and 10 best.

TABLE 4

|  | Standard Filled UPE | System I | System II |
|---|---|---|---|
| Pulse Endurance, minutes | 3200 | 4 | >6000 |
| Helical coil bond strength, lbs | 23 | 15 | 20 |
| Dielectric strength, vpm | 3000 | 3500 | 4300 |
| Corrosion | 6 | Under test | 8 |
| Settling | 1 | 9 | 9 |

TABLE 5

|  | Standard WBPE | System III |
|---|---|---|
| Pulse Endurance, minutes | 28 | 56 |
| Helical coil bond strength, lbs | 12 | 12 |
| Dielectric strength, vpm | 5400 | 3100 |
| Corrosion | 10 | 10 |
| Settling | 10 | 9 |

In view of the above, it will be seen that the several objects and advantages of the present invention have been achieved and other advantageous results have been obtained.

Having thus described the invention, what is claimed and desired to be secured by Letters Patent is:

1. A process for producing a storage stable liquid coating composition for an electromagnetic device to improve the electrical insulation resistance and corrosion protection properties of the device the process comprising:
   formulating a coating resin using a liquid, thermosetting resin material;
   forming a suspension of a nanomaterial in the liquid resin material by:
   (1) adding to the resin material between approximately 1-20% part by weight of an inorganic material having a particle size of between 1 and 150 nanometers; and
   (2) mechanically dispersing the inorganic material in the liquid resin material by mixing the liquid resin material and the inorganic material together to obtain a homogeneous liquid coating mixture; the liquid coating mixture being free of anti-settling agents; and
   storing the liquid coating composition in a liquid state and as a substantially homogeneous suspension until the liquid coating composition is applied to a substrate to form a coating on the substrate.

2. The process of claim 1 in which between approximately 1-5% part by weight of the inorganic material is dispersed in the resin material.

3. The process of claim 2 in which the inorganic material comprises one of silica, alumina, zirconia, or antimony pentoxide.

4. The process of claim 3 in which the resin material is a filled unsaturated polyester (UPE) coating material.

5. The process of claim 4 in which the resin material is a water borne polyester (WBPE) coating material.

6. The process of claim 1 in which the inorganic material is dispersed directly into the resin material.

7. The process of claim 1 in which the inorganic material is pre-dispersed into a carrier appropriate for the resin material with which the inorganic material is mixed.

8. A process for producing a storage stable liquid coating composition for an electromagnetic device to improve the electrical insulation resistance, and corrosion protection properties of the device; the process comprising:
    forming a suspension of an inorganic material in a liquid thermosetting resin composition; the inorganic material having a particle size in the range of 1-150 nanometers; the inorganic material being adding to the liquid thermosetting resin composition and mechanically dispersing the inorganic material in the liquid thermosetting resin composition until the inorganic material is homogeneously dispersed in the liquid thermosetting resin composition; the inorganic material being approximately 1-20% by weight of the liquid thermosetting resin composition; the inorganic material being chosen from the group consisting of silica, alumina, zirconia, and antimony pentoxide; the suspension being free of anti-settling agents; whereby a coating formed from the coating mixture has a dielectric strength greater than 3000 vpm; and
    storing the coating composition in a liquid state and as a substantially homogeneous suspension until the coating composition is applied to a substrate to form a coating on the substrate.

9. The process of claim 8 in which between approximately 1-5% part by weight of the inorganic material is dispersed in the resin composition.

10. The process of claim 8 wherein the resin composition is a polyester material.

11. The process of claim 10 wherein the polyester material is chosen from the group consisting of water borne polyester (WBPE) material and filled unsaturated polyester (UPE) coating material.

12. A method of increasing the electrical resistance of a resin-based coating composition; the method comprising:
    forming a suspension of a nanomaterial in a liquid, thermosetting resin composition by adding an inorganic material to the liquid, thermosetting resin composition and mechanically dispersing the inorganic material in the resin composition until the inorganic material is homogeneously dispersed in the resin composition; the inorganic material being approximately 1-20% by weight of the resin composition; the inorganic material being in the range of 1-150 nanometers and chosen from the group consisting of silica, alumina, zirconia, and antimony pentoxide; the suspension being free of anti-settling agents; whereby a coating formed from the coating mixture has a dielectric strength greater than 3000 vpm; and
    storing the coating composition in a liquid state and as a substantially homogeneous suspension until the coating composition is applied to a substrate to form a coating on the substrate.

13. The process of claim 1 wherein the storage stable liquid coating composition has a viscosity of less than 500 cP.

* * * * *